United States Patent [19]

Valley et al.

[11] Patent Number: 5,130,849
[45] Date of Patent: Jul. 14, 1992

[54] METHOD AND APPARATUS FOR ENERGY TRANSFERS BETWEEN OPTICAL BEAMS USING NEAR-BANDGAP ELECTROREFRACTIVE EFFECT

[75] Inventors: George C. Valley, Los Angeles; Marvin B. Klein, Pacific Palisades; Afshin Partovi, Los Angeles; Alan Kost, Pasadena; Elsa M. Garmire, Manhattan Beach, all of Calif.

[73] Assignees: Hughes Aircraft Company; University of Southern California, both of Los Angeles, Calif.

[21] Appl. No.: 421,480

[22] Filed: Oct. 13, 1989

[51] Int. Cl.$^5$ ............................ G02B 5/23; G02F 1/01
[52] U.S. Cl. ................................... 359/571; 359/241; 359/300; 359/315
[58] Field of Search ............... 350/354, 355, 356, 386, 350/394; 359/241, 300, 315, 571

[56] References Cited

U.S. PATENT DOCUMENTS

| | | | |
|---|---|---|---|
| 4,773,739 | 9/1988 | Valley et al. | 350/354 |
| 4,921,335 | 5/1990 | Ditman, Jr. | 350/354 |
| 4,936,660 | 6/1990 | Clendening, Jr. et al. | 350/354 |
| 4,937,539 | 6/1990 | Grinberg et al. | 350/348 |

FOREIGN PATENT DOCUMENTS 63-181484 7/1988 Japan .

OTHER PUBLICATIONS

"A Picosecond Optical Gate Using Photo-Induced Grating", Morimoto et al., JAP-J. Appl. Phys., vol. 20, #6, Jun. 1981, pp. 1129-1133.
Optics Letters, vol. 13, No. 4, Apr. 1988, Optical Society of America, B. Imbert et al., "High Photorefractive Gain in Two-Beam Coupling with Moving Fringes in GaAs: Cr Crystals", pp. 327-329.
Optics Letters, vol. 14, No. 17, Sep. 1, 1989, Optical Society of America, (Washington, D.C., US), G. C. Valley et al., "Picosecond Photorefractive Response of GaAs: EL2, InP: Fe, and CdTe:V", pp. 961-963.
A. Yariv, "Introduction to Optical Electronics, 2d Ed.", pp. 246-253 (1976).
Imbert et al., "High Photorefractive Gain in Two-Beam Coupling with Moving Fringes in GaAs:Cr Crystals", Optics Letters, vol. 13, pp. 327-329 (1988).
Van Eck et al., "Franz-Keldysh Electrorefraction and Electroabsorption in Bulk InP and GaAs", Applied Physics Letters, vol. 48, No. 7, Feb. 17, 1986, pp. 451-453.
Seraphin and Bottka, "Franz-Keldysh Effect of the Refractive Index in Semiconductors", Physical Review, vol. 139, No. 2A, 19 Jul. 1965, pp. A560-A565.
M. B. Klein, "Beam Coupling in Undoped GAAS at 1.06 $\mu$m Using the Photorefractive Effect", Optics Letters, vol. 9, No. 8, Aug. 1984.

Primary Examiner—Andrew J. James
Assistant Examiner—Mahshid Saadat
Attorney, Agent, or Firm—V. D. Duraiswamy; W. K. Denson-Low

[57] ABSTRACT

Enhanced energy transfers are achieved between optical beams by operating at wavelengths in the near-bandgap region of a photorefractive material, and employing an electrorefractive effect previously proposed only for single beams. An electric field is applied across a photorefractive medium of sufficient intensity to induce an electrorefractive coupling and consequent energy transfer between the beams. Gain enhancements are possible by orienting the photorefractive medium to obtain an electro-optic as well as an electrorefractive effect, and by a moving grating technique. The direction of energy transfer between the beams is controlled by the electric field direction, and can be reversed by reversing the field. Operation in the infrared region is made possible with semi-insulating materials. Applications include optical switches, amplifiers and phase conjugators.

32 Claims, 4 Drawing Sheets

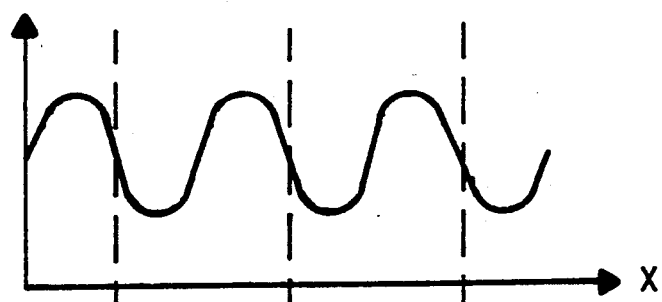
*Fig.4.a.*
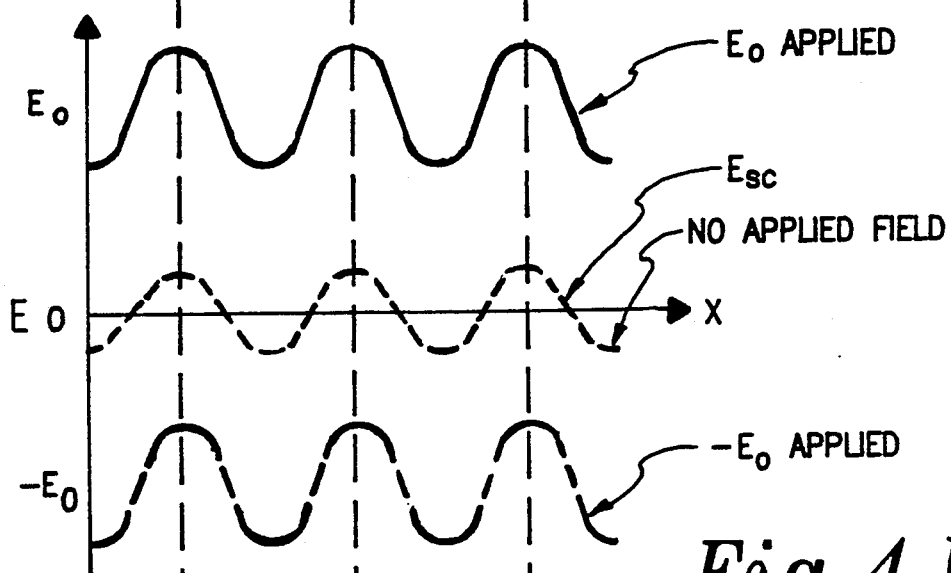
*Fig.4.b.*
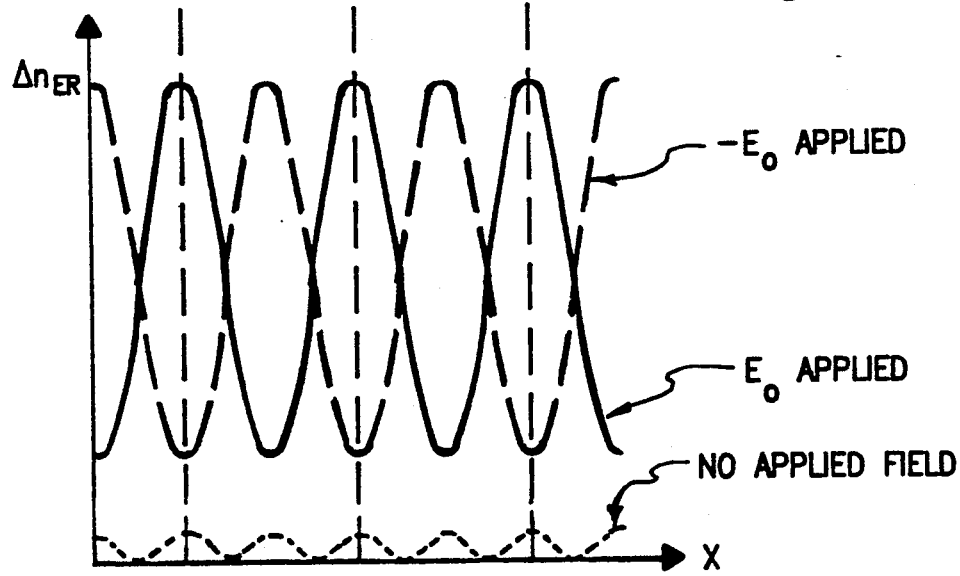
*Fig.4.c.*

METHOD AND APPARATUS FOR ENERGY TRANSFERS BETWEEN OPTICAL BEAMS USING NEAR-BANDGAP ELECTROREFRACTIVE EFFECT

BACKGROUND OF THE INVENTION

1. Field of the Invention

This invention relates to the photorefractive transfer of energy between optical beams.

2. Description of the Related Art

Photorefractive materials have been used in a number of different applications involving the processing of optical beams. (The terms "light" and "optical" as used herein are not limited to the visible spectrum, but are used in their broader sense to include other regions of the spectrum such as the infrared). One principle application is in phase conjugate mirrors (PCMs). Other applications include optical switching, holography, image processing and the performance of optical mathematical functions such as image amplification, pattern substraction, and pattern recognition.

In general, a photorefractive (PR) material is one in which the index of refraction changes under the influence of applied light, such as a laser beam. The light causes charges within the PR material to migrate and separate, producing an internal electrostatic field. This field produces a change in the crystal's refractive index by the linear electro-optic (EO) effect (the Pockels effect). The theory of the EO effect is described in a text by A. Yariv, "Introduction to Optical Electronics, 2d ed.", pages 246-253 (1976). The PR index grating, or periodic variation in the crystal's index of refraction, is a measure of the change in the index. PR materials generally comprise III-V and II-VI semiconductor combinations within the periodic table, and other crystals such as $BaTiO_3$, $Bi_{12}SiO_{20}$ and $KTa_{1-x}NB_xO_3$.

The formation of a PR index grating is illustrated in FIG. 1, in which the horizontal axis represents distance within the PR medium. The upper graph illustrates the pattern of light with a spatially periodic intensity I within the medium, while the next graph illustrates the resulting charge density. The mobile charges, illustrated as being of positive polarity, tend to accumulate in the dark regions of the light intensity pattern. The resulting periodic charge distribution produces a periodic electrostatic field E by Poisson's equation. This electric field, illustrated in the third graph of FIG. 1, then causes a change in the refractive index of the crystal by the linear EO effect. The index change is proportional to the EO coefficient and the space charge electrostatic field within the PR medium. The PR effect, illustrated in the last graph of FIG. 1, is nonlocal in that the maximum refractive index change does not occur at the peak of the light intensity. In FIG. 1 the spatial shift between the refractive index change and the intensity patter is 90° with respect to the grating period; in general, however, this shift can be any fraction of the grating period.

Large energy transfers between optical beams are important in applications such as high contrast optical switches, and efficient self-pumped phase conjugators for laser power combining or aberration correction. The necessary degree of energy transfer has been possible previously using conventional EO photorefractivity in materials such as $BaTiO_3$. These materials, however, have an undesirably slow response time. Furthermore, their sensitive wavelength region is in the visible, which is technologically less attractive than the near-infrared spectral region of diode and Nd:YAG lasers. Semi-insulating semiconductors, on the other hand, have a much faster response time and are compatible in wavelength with diode and Nd:YAG lasers. However, these semi-insulators do not exhibit sufficient photorefractivity to be useful, compared to $BaTiO_3$, because of their small EO coefficient. Some photorefractivity enhancement in these materials has recently been reported using a DC electric field and moving gratings, or an AC electric field, as in Imbert et al., "High Photorefractive Gain in Two-Beam Coupling with Moving Fringes in GaAs:Cr Crystals", *Optics Letters*, Vol. 13, pages 327-329 (1988). The best reported net gain coefficient in semiconductors, however, has been only about 10 $cm^{-1}$.

Another optical phenomenon of interest is the electrorefractive (ER) effect, also known as the FranzKeldysh effect. This is the change in absorption and refractive index of a semiconductor in the spectral region slightly smaller than the material's band gap. This effect has been measured in materials such as bulk InP and GaAs, as discussed in Van Eck, et al., "Franz-Keldysh Electrorefraction and Electroabsorption in Bulk InP and GaA", *Applied Physics Letters*, Vol. 48, No. 7, Feb. 17, 1986, pages 451-453. An earlier treatment of the ER effect in germanium and GaAs is given in Seraphin and Bottka, "Franz-Keldysh Effect of the Refractive Index in Semiconductors", *Physical Review*, Vol. 139, No. 2A, July 19, 1965, pages A560-A565.

The phenomenon is illustrated in simplified form in FIG. 2. The horizontal axis represents the photon energy of an applied optical beam (the beam energy varies inversely with its wavelength), while the vertical axis represents the material's absorption coefficient at each particular photon energy or wavelength. At an energy region $E_g$, corresponding to the material's bandgap energy between the conduction and valence bands, the curve turns abruptly upward to become totally absorbing. If an electric field is imposed across the material, the absorption curve shifts to one of the modified curves 2 in the area just below $E_g$, such that the transition becomes more gradual. The degree of shift from the basic absorption curve varies in accordance with the electric field strength. The region of variance near the absorption edge of the curve has been referred to as the "near-bandgap" region. This shift in absorption in the near-bandgap region is accompanied by a shift in the material's refractive index.

While of interest, investigations into the Franz-Keldysh effect have involved single optical beams, and have not been applicable to the current implementations described above for multiple-beam mixing. The investigations have been concerned with a region of high optical absorption, which further limits their application to practical systems.

SUMMARY OF THE INVENTION

The present invention seeks to provide a method to perform multiple-wave mixing that is applicable to fast response materials such as semi-insulators and to the near-infrared spectral region of diode and semiconductor lasers, and yet achieves an energy transfer between beams sufficient for devices such as high contrast switches and phase conjugators. Rather than using a bulk ER effect to obtain a refractive index shift in the near-bandgap region for a single beam, the present invention uses the ER effect to form a grating which is large compared to the linear EO grating employed in conventional photorefraction, and to employ the ER grating in an energy transfer between a plurality of mutually coherent optical beams. Because the ER grating is phase shifted with respect to the sinusoidal optical intensity pattern produced by interference between the two beams, an energy transfer is achieved from one beam to the other. This energy transfer can be large because the variation in refractive index in the near-bandgap region is large. By orienting the PR medium so that EO photorefraction also occurs, the ER and EO photorefractive effects can be combined to increase the beam coupling gain. Other techniques, such as the employment of moving gratings, can also be employed to further increase the energy transfer.

The sensitivity and short response times of the PR effect in semiconductors are thus combined with the large ER properties of these materials in the near-bandgap region to produce superior inter-beam energy transfers. By simply controlling the applied field direction, the direction of energy transfer between the beams can be controlled, making bi-directional switching possible. The method is also applicable to materials which do not exhibit a conventional PR effect, for example, silicon or polycrystalline materials or materials with zero electro-optic coefficients. Applications for the technique include both self-pumped and four wave mixing phase conjugators, and optical switches and amplifiers.

These and other features and advantages of the invention will be apparent to those skilled in the art from the following detailed description of preferred embodiments.

DESCRIPTION OF THE DRAWINGS

FIGS. 4a, 4b and 4c are graphs illustrating the optical intensity gradient, electric field and refractive index grating within a PR medium in accordance with the invention;

DETAILED DESCRIPTION OF THE INVENTION

It has been discovered that, by generating an optical intensity pattern associated with optical beams transmitted through a PR medium with an externally applied electric field, and by carefully selecting the beams and PR medium such that operation takes place within the near-bandgap region, an ER grating results through which greater transfers of energy from one beam to another can be achieved than has previously been attainable. This finding has many important consequences for beam processing, particularly for fast response materials capable of operating in the near-infrared region of the spectrum, such as semi-insulating compound semiconductors. Employing the invention, these materials can now be used successfully for applications such as phase conjugation and optical switching and amplification.

Figure 1:
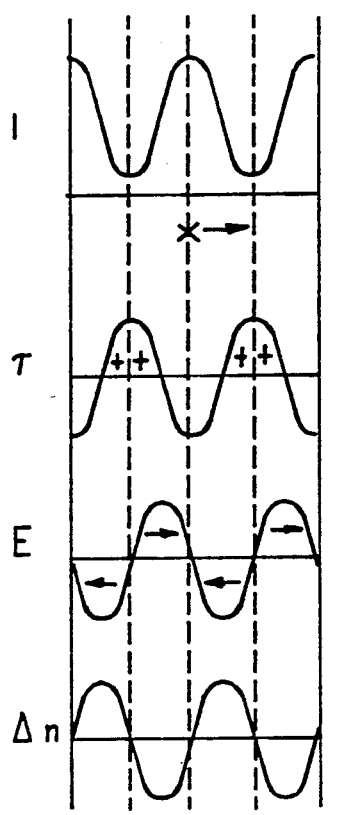
FIG. 1 is a series of graphs, described above, showing the optical intensity grating formed by a beam within a PR medium, and the resulting periodic charge accumulation, electrostatic field and PR grating.
Figure 2:
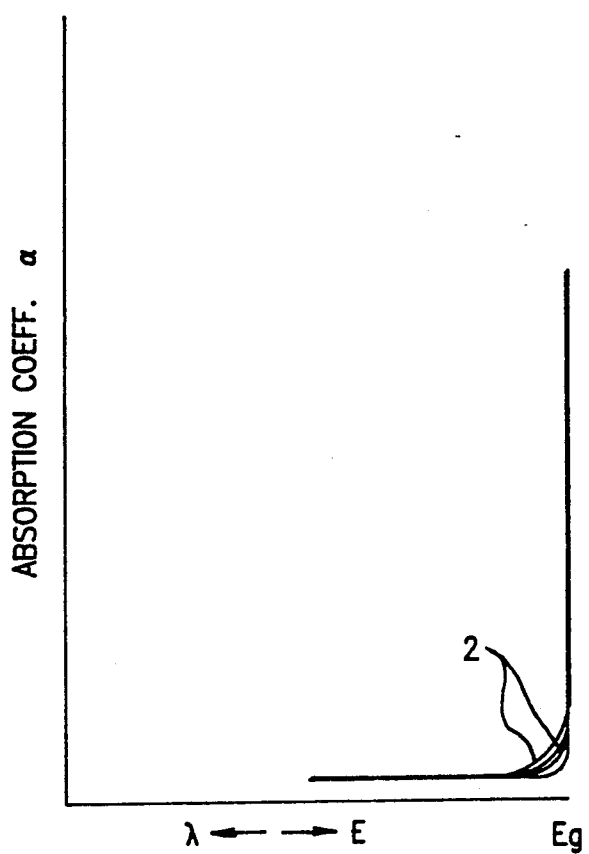
FIG. 2 is a graph illustrating the dependence of the absorption coefficient upon incident optical wave energy in a PR medium.
Figure 3:
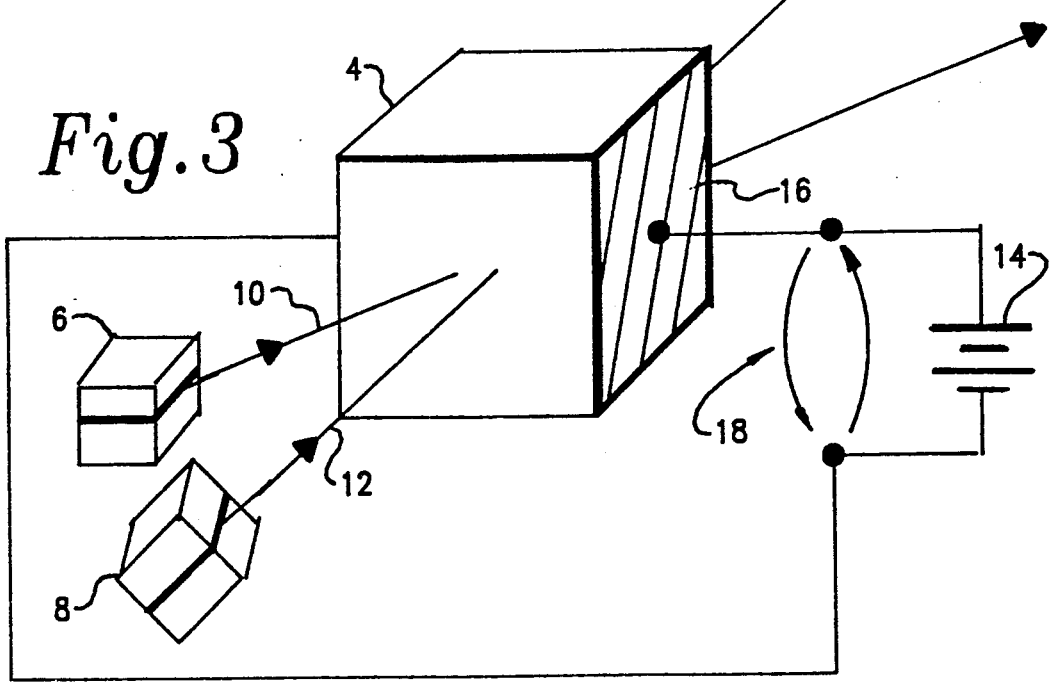
FIG. 3 is a simplified diagram showing the use of the invention to switch and transfer power between two optical beams.

An implementation of the invention is shown in simplified form in FIG. 3. The optical energy transfer takes place within a PR medium 4. In general, some degree of energy transfer should be attainable with virtually any material having a partially populated defect or dopant level between the valence and conduction bands, with a capability of photoionizing charge from this region (the "midgap center"). By using semiconductors such as GaAs, InP, CdTe and other III-V and II-VI compounds and their alloys, much faster response times are possible than previously. Semi-insulators, which are semiconductors in which the Fermi level is near midgap, are particularly suitable. The invention is also applicable to materials, such as silicon and polycrystalline substances, which do not exhibit an EO effect. Like conventional PR materials, these non-EO materials have defect states which produce charge separation and internal electric fields that result in a PR effect. If a particular semiconductor's near-bandgap region is close to but not precisely matched with the wavelength of a desired source, it may be possible to achieve a more precise matching by tuning the near-bandgap region with an alloy of the semiconductor material.

A plurality of optical beams are mixed within the PR medium to produce an energy transfer between them. In FIG. 3 the beams are illustrated as being produced by a pair of laser diodes 6 and 8. One of the advantages of the invention is that, by making operation possible with semiconductor lasers, the beam sources and the PR medium can be monolithically integrated together on the same chip.

Lasers 6, 8 are selected such that their beams 10, 12 are mutually coherent, with a wavelength in the near-bandgap region of the PR medium 4. An electric field is induced through the PR medium by a DC voltage source 14 whose positive and negative terminals are connected to electrode plates 16 on opposite faces of the PR medium 4. A net DC electric field is required to establish an ER grating suitable for energy transfer within the PR medium 4. If desired, an AC ripple can be superimposed upon the DC field and employed as an encoding mechanism or the like.

If the beams 10, 12 are kept within the near-bandgap region of the PR medium 4, it has been found that an energy transfer between beams will result. Thus, the system of FIG. 3 can be used to amplify one of the beams at the expense of the other. If the amplification is great enough, the system can function as an optical switch, with the beam receiving the energy transfer being "off" in the absence of an electric field when there is no energy transfer, and "on" when the field is applied. A distinct advantage of this arrangement is that the direction of energy transfer can be controlled by the direction of the electric field. For a given field direction, the direction of energy transfer between beams 10 and 12 is determined by the orientation of the beams relative to the field, and by whether the dominant photo carriers in the PR medium 4 are electrons or holes. Whatever the direction of energy transfer turns out to be, it can be easily reversed by simply reversing the field direction. A reversing switch 18 which interchanges the terminals of DC source 14 is illustrated for this purpose.

When the applied field is reversed, the refractive index variation within medium 4 shifts by 180°, so that the direction of energy transfer is reversed. Without the applied field, there is no energy transfer. When the field is reduced to zero, the field inside the crystal varies about zero and the refractive index, which depends upon the magnitude of the field in the near-bandgap region, varies with a spatial period half that of the intensity pattern; this variation will not transfer energy.

The intersection of the two mutually coherent optical beams 10, 12 within the PR crystal 4 generates a sinusoidal intensity grating pattern, illustrated in FIG. 4a. This optical intensity variation results in a space charge field $E_{sc}$, illustrated in FIG. 4b, through the usual diffusion and drift processes. When a DC electric field is applied, the total electric field $E_o$ within the crystal is equal to the sum of the externally applied field and the internally generated space charge field. In general, the application of an external field will increase the magnitude of the space charge field and change the phase shift between the intensity and space charge field patterns. For applied field magnitudes substantially greater than the limiting space charge field that the PR material can sustain, this phase shift is approximately 90°; under these conditions the component of $E_{sc}$ in phase with the optical intensity pattern can be ignored. A 90° phase shift produces optimum energy transfer between beams.

The ER-induced change in the index of refraction n typically varies with the square of the electric field for photon energies below the bandgap level. FIG. 4c shows the ER change in refractive index for two directions of applied field, and for a zero applied field. The relative phase shift of the ERPR grating with respect to the optical intensity pattern can be seen to depend upon the direction of the applied field, but in both cases the ER grating is 90° out of phase with respect to the intensity pattern and can thus transfer energy. Since the relative phase shift determines the direction of energy transfer, the direction of energy transfer thus depends uniquely upon the electric field direction (and the dominant photocarrier species). Thus, a system such as that shown in FIG. 3, which is based upon such a grating, can act as an optical switch with the output determined by the direction of electric field. This is in direct contrast to conventional PR devices, in which an applied field increases the energy transfer without effecting its direction. With conventional EOPR energy transfer, the transfer direction is determined solely by the crystal orientation and the dominant photocarrier species.

When no external field is applied, the space charge field is created through diffusion and has a zero average value. As illustrated in FIG. 4c, the induced ERPR grating in this case will have twice the spatial frequency of the space charge field pattern, and thus cannot transfer energy.

The "near-bandgap" region can be defined empirically as that region in which there is a sufficient ER effect to produce a significant energy transfer between mutually coherent energy beams. The region was determined experimentally for GaAs. The important result is that the near-bandgap region extended sufficiently far away from the absorption edge so that substantial energy transfers could be realized between beams for wavelengths at which most of the beams were transmitted, rather than absorbed in the crystal. This leads to the conclusion that the ER effect might be useful for optical energy transfers in practical devices.

Figure 5:
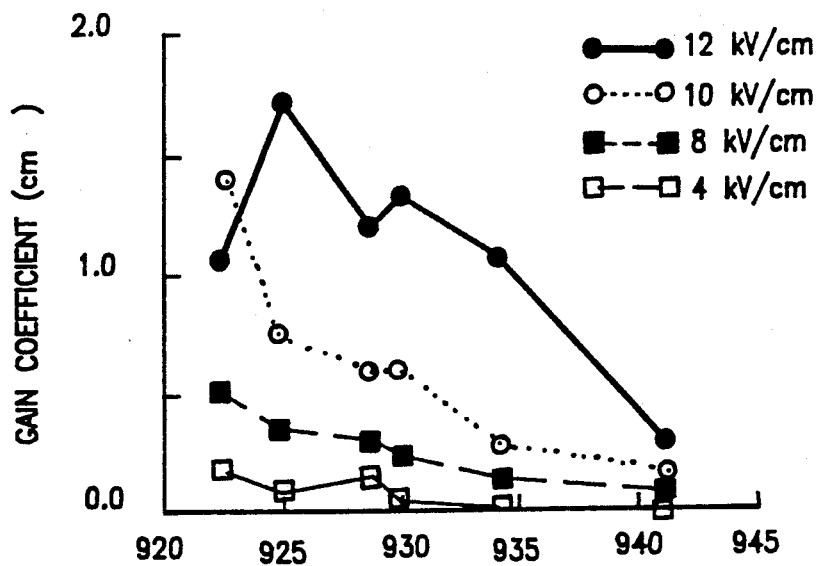
FIG. 5 is a graph of experimental results which relate optical gain coefficient and input beam wavelength to define the near-bandgap region for a PR material for different values of an applied electric field.
Figure 6:
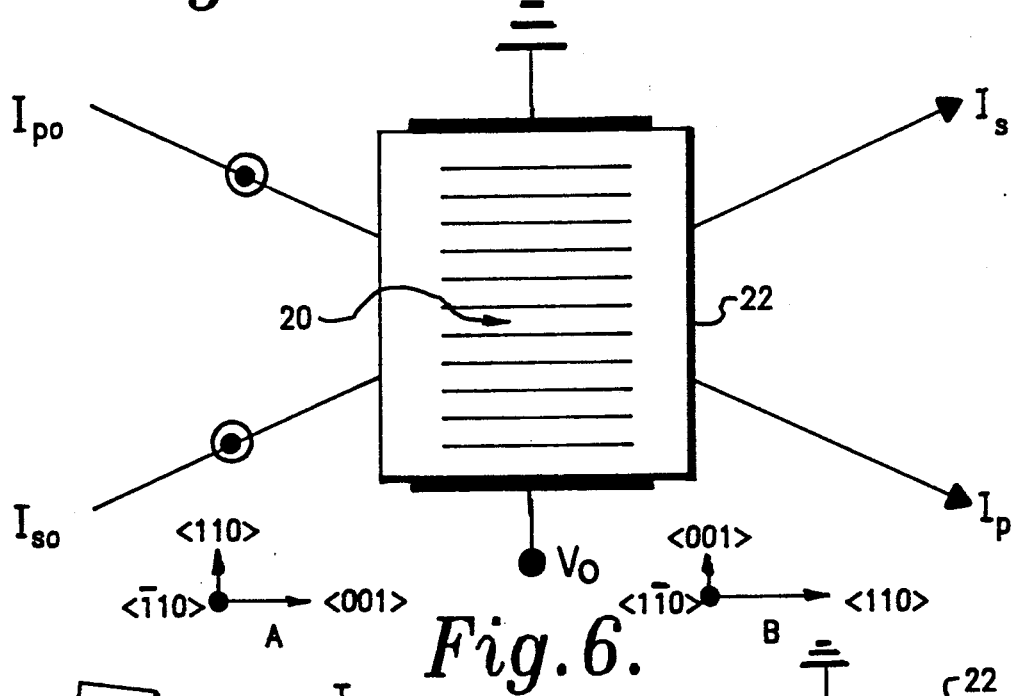
FIG. 6 is a diagram illustrating a system capable of operating with only the ER effect, or with a combined EO and ER effect in accordance with the invention.

The results of the experiments are summarized in FIG. 5, in which the optical gain coefficient is plotted as a function of wavelength for different values of applied field. The crystal bandgap energy was about 1.43 eV, corresponding to an absorption edge of about 870 nm. The experimental setup is illustrated in FIG. 6. An ER grating 20 was formed in the GaAs crystal 22 by applying a voltage source $V_o$ to an electrode plate on one side of the crystal, and grounding an electrode plate on the opposite side of the crystal. An incident pump beam $I_{po}$ and an incident signal beam $I_{so}$ were applied to the crystal at an angle of 15.3° to each other. An argon-pumped Ti:Sapphire laser tunable between 900 and 1,000 nm was used to generate the beams. The $I_{po}$ and $I_{so}$ intensities were respectively 17 and 1.2 mW/cm$^2$, and were kept constant for different wavelengths. The geometric orientation of the crystal, indicated by diagram A, was selected so that there was no EO grating for beams polarized perpendicular to the plane of incidence.

Without an applied field, no energy transfer was observed. The data displayed in FIG. 5 was obtained by fixing the wavelength and increasing the field, then shifting to a different wavelength and repeating the field variation. Results in the general range of 920-940 nm, corresponding to photon energies of 1.35-1.32 eV, are displayed. Large gain coefficients were also observed below 910 nm, but the increased photoconductivity resulted in large currents and crystal heating that prevented accurate measurements. In addition to the data displayed in FIG. 5, a gain coefficient of 2.8 cm$^{-1}$ was observed with a wavelength of 922 nm and an applied field of 14 kV/cm.

The direction of energy transfer changed when the field direction was reversed. This reversal of energy transfer direction, along with the spectral shape of the gain coefficient, indicates that the energy transfer was indeed due to an ER mechanism. The particular crystal material employed was GaAs:EL2, which is dominated by electrons at wavelengths smaller than a micron. A positive value of $V_o$ resulted in gain for the signal beam $I_{so}$, which is consistent with electrons as the dominant charge carrier species. No energy transfer was observed when the pump beam $I_{po}$ was cross-polarized with respect to the signal beam $I_{so}$, ruling out the possibility of bulk absorption modulation within the pump beam. Experiments conducted with other crystals, crystal geometries and beam polarizations ruled out the possibility of the energy transfer being the result of an EO effect.

The near-bandgap region for the experimental crystal illustrated in FIGS. 5 and 6 can thus be defined as the area down to about 0.11 eV below the bandgap level, or about 60-80 nm above the absorption edge. Similar determinations of the near-bandgap range for other materials can be determined empirically.

Even greater degrees of energy transfer were achieved by combining the ERPR and EOPR effects. This was accomplished with the crystal geometry indicated by diagram B in FIG. 6, at which the crystal was oriented for EOPR signal gain and the electric field was oriented for ERPR signal gain. A gain of 7.6 cm$^{-1}$ was observed with a grating spacing of 5.4 microns, an applied field of 10 kV/cm, and an optical wavelength of 937 nm. Reversing the electric field direction resulted in a very small gain for the signal beam, apparently indicating that the EOPR effect was slightly larger than the ERPR effect under these conditions.

Figure 7:
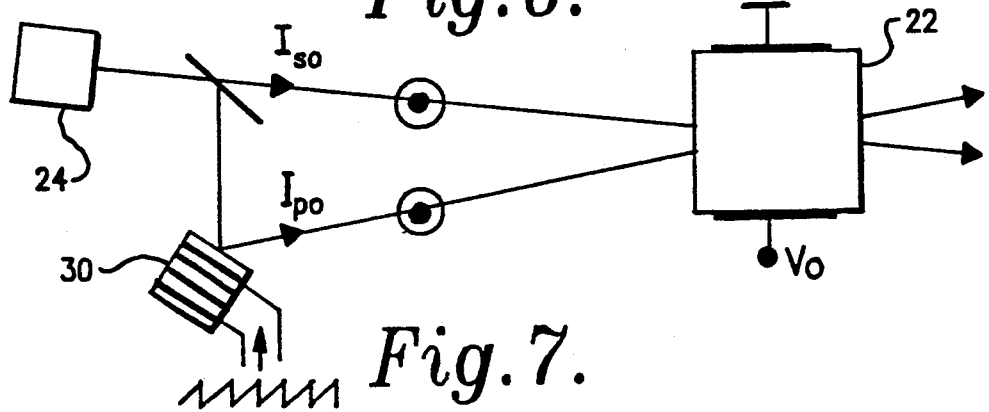
FIG. 7 is a diagram of a variation of the invention in which moving gratings are employed to enhance the energy transfer between optical beams.

Additional gain has been achieved by using the invention in conjunction with the previously developed moving grating technique. The set-up is illustrated in FIG. 7. The same laser 24 was used as in the experiments described above. A 939 nm laser beam was generated and divided by an unbalanced beam splitter 28 into pump and signal beams $I_{po}$ and $I_{so}$, rated at 140 and 0.029 mW/cm$^2$, respectively. There was a grating spacing of 7.0 microns, and an applied field of 10 kV/cm was employed.

The pump beam $I_{po}$ was directed onto a piezomirror 30, which was driven by a sawtooth control voltage. The periodic movement of the piezomirror 30 created a similar periodic variation in the path length for $I_{po}$, thereby developing a moving grating within the PR crystal 22. A very large gain of 16.3 cm$^{-1}$ was obtained with a piezomirror velocity of 30 microns/sec. Since this gain was not optimized with respect to either the grating spacing or beam ratio, significant additional enhancements and gains should be obtainable.

The very high gains experienced with a semi-insulating semiconductor such as GaAs at infrared wavelengths indicates that new devices of this type may be used to perform tasks which have previously been done with BaTiO$_3$, but with much faster response times and at more desirable wavelengths; GaAs is at least 50,000 times faster than BaTiO$_3$ in the infrared region. Potential applications include two-wave mixing with gain for optical interconnects, signal processing and logic gates.

Figure 8:
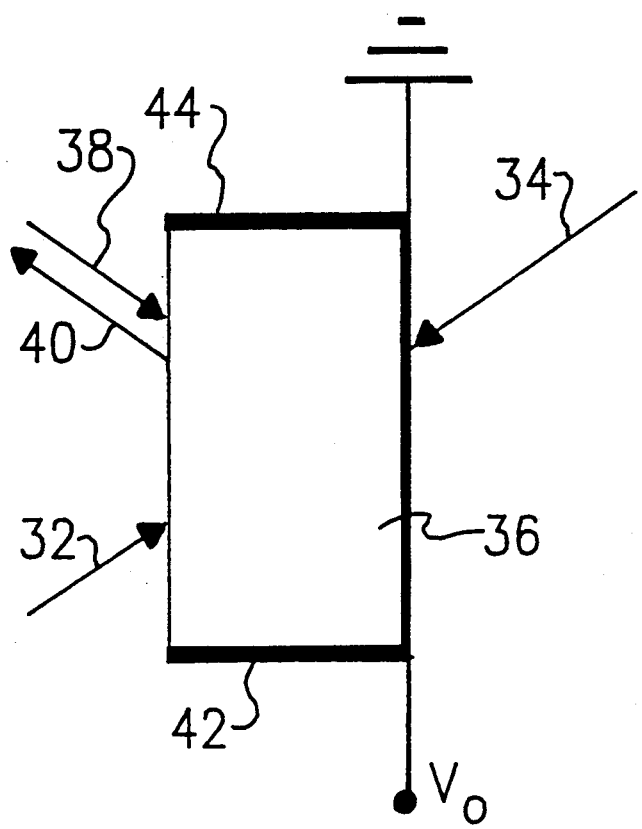
FIGS. 8 and 9 are simplified diagrams showing the principles of the invention applied respectively to a four-wave mixing phase conjugator, and to a self-pumped phase conjugator.

Phase conjugators are a primary application for the invention. Basically, a phase conjugate mirror (PCM) produces a retro-reflection of an incident beam, with the phase of the reflected beam reversed from that of the incident beam at the point of reflection. A typical PCM known in the art is depicted in FIG. 8. It is illustrated as a four-wave mixer, in which a pair of contradirected laser beams 32 and 34 are directed into a PR medium 36. An initializing laser beam 38, equal in frequency to beams 32 and 34, is directed into the mixing medium from the side. A reflected beam 40 is returned from the medium in a direction opposite to that of incident beam 38. Since power is pumped into the system by beams 32 and 34, the PCM may produce an amplification of return beam 40 over incident beam 38. In addition to being retroreflected, the phase conjugated beam 40 also undergoes a phase reversal with respect to the incident beam at the point of reflection.

In accordance with the invention, an electric field is applied across the PR medium 36. For example, a voltage differential can be applied to electrode plates 42, 44 on opposite sides of the medium. By selecting a PR medium 36 and incident beam 38 such that the beam's wavelength is within the near-bandgap region of the medium, an enhanced energy transfer from the pump beams to the reflected beam can be achieved by means of the ER effect.

The invention has particular application to self-pumped PCMs. This type of device does not employ external pump beams, and therefore does not produce amplification. An incident signal beam generates noise waves within a PR medium. These noise waves are then amplified by the input beam in a two-wave amplification process that builds up until the weak noise waves are strong enough to produce a conjugate beam contradirectional to the input signal beam.

Figure 9:
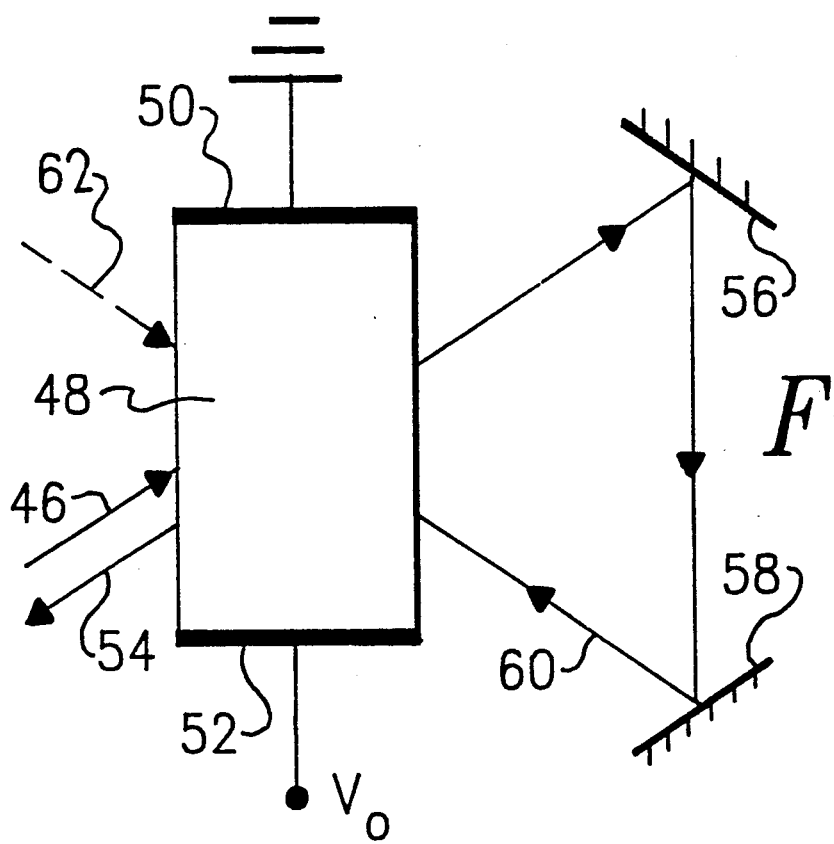

To achieve self-pumping operation, the product of the PR medium's gain coefficient and its length must exceed a factor on the order of 5. By applying the present invention to a self-pumped PCM, self-pumping operation can be achieved with smaller PR crystal dimensions and simpler geometries than previously, and may make self-pumped operation possible at previously unattainable wavelengths. A simplified self-pumped PCM employing the invention is illustrated in FIG. 9. An input signal beam 46 is applied to a PR medium 48, with the beam wavelength within the near-bandgap region of the PR medium. ERPR gratings are formed within the medium by an electric field established between opposed electrodes 50 and 52. The conjugated return beam is indicated by arrow 54. In the case of a self-pumped PCM, the energy transfer takes place between the externally applied signal beam 46 and an internally noise generated wave which results in the conjugate beam 54. In the particular implementation illustrated in FIG. 9, the signal beam 46 is reflected by mirrors 56 and 58 behind the PR medium 48 back into the medium. The reflected beam 60 produces a contra-directed noise generated wave within the PR medium, represented by dashed arrow 62, with which it cooperates as a pump for conjugated beam 54. Several other self-pumped PCM designs are also currently known.

The invention can thus be seen to have numerous applications where a greater degree of optical energy transfer is desirable, particularly in the infrared and near-infrared regions. While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of transferring energy between a plurality of mutually coherent optical beams, comprising:

transmitting the beams through a photorefractive (PR) medium having a predetermined bandgap wavelength and a substantial population of defect states between valence and conduction bands to generate an optical intensity-induced space charge grating within said medium, said beams and PR medium being selected such that substantially all of the beam energy is in the near-bandgap region of the PR medium, applying an electric field across the PR medium of sufficient intensity to induce, through the electrorefractive (ER) effect, a substantially larger refractive index grating within the medium that is substantially out-ofphase with respect to said optical intensity grating, and diffracting said beams from said refractive index grating to produce an energy transfer between the beams.

2. The method of claim 1, said PR medium comprising a semiconductor material.

3. The method of claim 2, said PR medium comprising a semi-insulating material.

4. The method of claim 1, said PR medium comprising an electro-optic (EO) material, further comprising the step of orienting the PR medium with respect to said beams to generate an EO grating within said PR medium which is additive to said ER effect to increase the energy transfer between said beams.

5. The method of claim 1, said PR medium comprising a non-electro-optic (non-EO) material.

6. The method of claim 1, further comprising the step of periodically adjusting one of the beams to periodically vary said optical intensity grating in a moving grating mode.

7. The method of claim 1, wherein the direction of the applied electric field is selected to control the direction of energy transfer between said beams.

8. The method of claim 7, wherein the applied electric field is first established with a first direction of energy transfer between said beams, and the electric field direction is then reversed to reverse the direction of energy transfer between said beams.

9. The method of claim 1, said electric field comprising a direct current (DC) field.

10. A photorefractive (PR) optical energy transfer method, comprising:
providing a PR medium having a predetermined bandgap wavelength and a substantial population of defect states between valence and conduction bands,
applying a plurality of mutually coherent optical beams to said PR medium to generate an optical intensity grating therein,
selecting the beam wavelengths so that substantially all of the beam energy is in the near-bandgap region of said PR medium, and
applying an electric field to said PR medium to establish within said medium a refractive index grating via the electrorefractive (ER) effect which is out-of-phase with respect to said optical intensity grating, the strength of said electric field being great enough to establish a sufficient offset of the refractive index grating from a neutral level to produce an energy transfer between said beams.

11. The method of claim 10, said electric field being substantially greater than the limiting space charge field which the PR material can sustain to produce a refractive index grating which is approximately 90° out-of-phase with said optical intensity grating.

12. The method of claim 10, wherein said beams are generated by solid state devices at wavelengths within the near-bandgap region of said PR material.

13. The method of claim 10, said PR medium comprising a semiconductor material.

14. The method of claim 13, said PR medium comprising a semi-insulating material.

15. The method of claim 10, said PR medium comprising an electro-optic (EO) material, further comprising the step of orienting the PR medium with respect to said beams to generate a refractive index grating within said PR medium via the EO effect which is additive to said grating established via the ER effect to increase the energy transfer between said beams.

16. The method of claim 10, said PR medium comprising a non-electro-optic (non-EO) material.

17. The method of claim 10, further comprising the step of periodically adjusting one of the beams to periodically vary said interference grating in a moving grating mode.

18. The method of claim 10, wherein the direction of the applied electric field is selected to control the direction of energy transfer between said beams.

19. The method of claim 18, wherein the applied electric field is first established with a first direction to establish a first direction of energy transfer between said beams, and the electric field direction is then reversed to reverse the direction of energy transfer between said beams.

20. The method of claim 10, said electric field comprising a direct current (DC) field.

21. A system for transferring energy between a plurality of mutually coherent optical beams, comprising:
a photorefractive (PR) material having a predetermined bandgap wavelength and a substantial population of defect states between valence and conduction bands,
means for generating and directing into said PR material a plurality of mutually coherent optical beams at wavelengths such that substantially all of the beam energies are in the near-bandgap region of said PR material so as to generate an optical intensity grating within the material, and
means for applying an electric field across the PR medium of sufficient intensity to induce, through the electrorefractive (ER) effect, a refractive index grating within the medium that is substantially out-of-phase with respect to said optical intensity grating, said refractive index grating causing a diffraction of said beams and a consequent energy transfer between the beams.

22. The system of claim 21, said PR material comprising a phase conjugating medium, wherein said beams are arranged to produce a phase conjugate of one of the beams from said medium.

23. The system of claim 22, implemented as a four-wave mixing phase conjugate mirror, wherein said optical beams comprise an input beam and a pair of contra-directed pump beams, and a phase conjugated noise beam generated within said medium.

24. The system of claim 22, implemented as a self-pumped phase conjugate mirror, wherein said optical beams comprise an input beam and a phase conjugated noise beam generated within said medium in response to the input beam and amplified thereby.

25. The system of claim 21, implemented as an optical amplifier, wherein said beam generating and directing means generate and direct a pair of beams into said PR material at an angle to each other to produce a two-wave mixing between the beams within the PR material.

26. The system of claim 25, further comprising means for controlling the direction of the applied electric field to control the direction of energy transfer between said beams.

27. The system of claim 26, said means for controlling the direction of the applied electric field including means for reversing the field direction to reverse the direction of energy transfer between said beams.

28. The system of claim 21, said PR material comprising a semiconductor.

29. The system of claim 28, said PR material comprising a semi-insulator.

30. The system of claim 21, wherein said PR material is an electro-optic (EO) material and is oriented with respect to said beams to generate an EO grating within said PR material which adds to said refractive index grating to increase the energy transfer between said beams.

31. The system of claim 21, wherein said PR material is a non-electro-optic (non-EO) material.

32. The system of claim 21, wherein said means for applying an electric field applies a direct current (DC) field across the PR material.

* * * * *